United States Patent [19]

Köll

[11] Patent Number: 4,855,505

[45] Date of Patent: Aug. 8, 1989

[54] PROMOTED NICKEL AND/OR COBALT CATALYST, ITS USE, AND PROCESS PERFORMED IN ITS PRESENCE

[75] Inventor: Juhan Köll, Stenungsund, Sweden

[73] Assignee: Berol Kemi AB, Stenungsund, Sweden

[21] Appl. No.: 940,221

[22] Filed: Dec. 8, 1986

Related U.S. Application Data

[62] Division of Ser. No. 647,471, Sep. 5, 1984, Pat. No. 4,701,434.

[30] Foreign Application Priority Data

Sep. 9, 1983 [SE] Sweden ................................. 8304828

[51] Int. Cl.$^4$ .............................................. C07C 85/08
[52] U.S. Cl. ..................................... 564/398; 564/399; 564/401; 564/402; 564/472; 564/473; 564/475; 564/477; 564/480
[58] Field of Search ................ 564/398, 399, 401, 402, 564/472, 473, 475, 477, 480; 585/276, 277

[56] References Cited

U.S. PATENT DOCUMENTS

| | | | |
|---|---|---|---|
| 1,449,423 | 3/1923 | Lowy et al. ......................... | 564/402 |
| 2,365,721 | 12/1944 | Olin et al. ........................... | 564/480 |
| 2,666,756 | 1/1954 | Boyd et al. .......................... | 526/108 |
| 3,278,598 | 10/1966 | Markiewitz ......................... | 564/391 |
| 3,595,932 | 7/1971 | Maslyansky et al. ............... | 585/487 |
| 3,597,483 | 8/1971 | Haarer et al. ....................... | 564/475 |
| 3,766,184 | 10/1973 | Johansson et al. .................. | 544/358 |
| 4,036,883 | 7/1977 | Voges et al. ........................ | 564/473 |
| 4,097,368 | 6/1978 | Hayes .................................. | 208/139 |
| 4,115,463 | 9/1978 | Murtha ................................ | 585/268 |
| 4,151,204 | 4/1979 | Ichikawa et al. .................... | 564/480 |
| 4,251,462 | 2/1981 | Braden et al. ....................... | 564/455 |
| 4,263,175 | 4/1981 | Pesa et al. ........................... | 252/473 |
| 4,268,699 | 5/1981 | Murtha et al. ...................... | 585/268 |
| 4,495,369 | 1/1985 | Werner et al. ...................... | 564/480 |
| 4,510,320 | 4/1985 | Pesa et al. ........................... | 560/265 |

FOREIGN PATENT DOCUMENTS

| | | |
|---|---|---|
| 721732 | 11/1965 | Canada . |
| 0030434 | 6/1981 | European Pat. Off. . |
| 0055512 | 10/1981 | European Pat. Off. . |
| 48-66086 | 9/1973 | Japan . |
| 49-119887 | 11/1974 | Japan . |
| 1604246 | 12/1981 | United Kingdom . |

*Primary Examiner*—Richard L. Raymond
*Assistant Examiner*—Raymond Covington
*Attorney, Agent, or Firm*—Spencer & Frank

[57] ABSTRACT

The invention relates to a ruthenium promoted nickel and/or cobalt dehydrogenation-hydrogenation catalyst. The ruthenium on the catalyst is applied from a solution containing a ruthenium halide compound. The catalyst use in organic reactions and a process performed in its presence are also described. Preferably, the catalyst is used to aminate alkylene oxides, alcohols, phenols, alkanolamines, aldehydes, and ketones.

22 Claims, No Drawings

PROMOTED NICKEL AND/OR COBALT CATALYST, ITS USE, AND PROCESS PERFORMED IN ITS PRESENCE

This is a division of application Ser. No. 647,471 filed Sept. 4, 1984, now U.S. Pat. No. 4,701,434.

BACKGROUND OF THE INVENTION

1. Field of the Invention

This invention relates to a ruthenium promoted nickel or/and cobalt dehydrogenation-hydrogenation catalyst, its use in organic reactions, and a process performed in its presence. The catalyst may be used to aminate alkylene oxides, hydroxyl containing compounds, such as alcohols, phenols and alkanolamines, aldehydes and ketones.

2. Background of the Art

The catalytic amination of alcohols is a well-known process. By this process alkylene oxides, hydroxyl containing compounds, aldehydes, and ketones can be aminated by reacting said compounds with ammonia, primary amines or secondary amines in a continuous or batchwise process in the presence of hydrogen gas and a hydrogenationdehydrogenation catalyst. All hydrogen atoms on an ammonium or amine nitrogen are potentially replaceable by the alkyl radical of the alkylene oxide, hydroxyl containing compound, aldehyde and ketone, so the reaction product will be a mixture of primary, secondary, and tertiary amines.

When aminating hydroxyl containing compounds, such as ethylene glycols and ethanolamines, not only straight-chain di- and polyamines, but also branched chain polyamines and sixmembered heterocyclic amines, such as piperazine, morpholine, and their derivates, are obtained. The most desirable products in the manufacture of ethylene amines are such containing mainly primary amino groups. Ethylene amines containing tertiary amino groups and heterocyclic rings are of less commercial interest.

Various catalysts have been used to promote the process and most of them are based on nickel and/or cobalt. In order to improve the selectivity in respect to the product mix and to increase the reaction rate, a large number of promotors have been used, such as compounds of copper, magnesium, chromium, iron, and zinc. Among patents describing amination of organic material the U.S. Pat. No. 1,449,423 and the U.S. Pat. No. 2,365,721 may be mentioned. The U.S. Pat. No. 3,766,184 discloses a nickel and/or cobalt and iron containing catalyst which increases the formation of ethylene diamine and decreases the formation of piperazine. In the U.S. Pat. No. 3,278,598 a Raney nickel catalyst is described, in which catalyst rodium, palladium, or ruthenium supported on carbon is introduced as a cocatalyst. However, this catalyst increases the formation of secondary amine groups at the expense of primary amine groups.

SUMMARY OF THE INVENTION

In accordance with the present invention a new catalyst has been found, which favors the formation of primary and noncyclic amines. The catalyst is a supported cobalt and/or nickel hydrogenation-dehydrogenation catalyst promoted with ruthenium. It contains, calculated on an oxide-free, i.e., metallic basis and in weight percent based on the total weight of the catalyst, a total amount of 4–40 % cobalt and/or nickel, and 0.1–5 % ruthenium on a porous metal oxide support. The catalyst is further characterized by a physical configuration obtainable by a. Impregnating the support coated with nickel and/or cobalt present as metal or oxides in finely divided form with a solution of a ruthenium halide compound, and b. Drying the catalyst intermediate and reducing the ruthenium halide compound at elevated temperature in a stream of hydrogen gas to ruthenium metal, and if necessary finally reducing nickel/cobalt oxides in hydrogen gas to finely divided nickel/cobalt metal.

When this catalyst is employed in the amination of hydroxyl containing compounds, such as alcohols, phenols and alkanolamines, aldehydes, ketones, and alkylene oxides, with ammonia or primary amines, higher yields of the desired primary amines and polyamines are obtained, and the formation of undesired by-products are largely reduced as compared to amination carried out in the presence of a prior art catalyst. It cannot be stated with certainty, whether the advantageous results obtained through the use of the catalyst according to the invention in such amination processes are related to the way in which cobalt and/or nickel and ruthenium are deposited on the support, or whether the metals and the support have undergone chemical reactions to give new physical and chemical charateristics to the catalyst. However, it can be shown that catalysts prepared in similar way, but by using ruthenium compounds others than halogenides, give a lower proportion of primary amines in the amination product mix.

DESCRIPTION OF THE PREFERRED EMBODIMENTS

The metal oxide support materials, which have been found to produce the most active and selective amination catalysts are those containing more than 95 % activated alumina. Less active but still selective catalysts can be made from conventional metal oxide supports containing at least 50 % alumina and/or silica. Examples of such supports are those consisting of alumina/silica, alumina/titania, alumina/magnesia, alumina/zirconia, and others combinations. The inner surface area of the catalyst support is not critical and may vary from 10 to 1000, preferably 20–400 square meters per gram support, but the area is suitably adapted to the metal amount in order to achieve a mainly monomolecular layer of catalyst metals on the support. A number of such support materials are well-known in the art and are also commercially available.

The chemical nature of the support materials largely influence the catalyst properties. As an example carbon supported, ruthenium-promoted, nickel and/or cobalt catalysts show no selectivity on primary amines but on contrary promote formation of secondary and tertiary amines.

Other supports of mainly acid nature may even give better activity with ruthenium promotion than without, but the catalysts made from these supports are less selective than those built on metal oxides.

The support material used in the invention may be coprecipitated with nickel and/or cobalt salts, or these metals can be transferred to the support by impregnation with solutions of metal salts. Various organic and inorganic nickel and cobalt salts may be used for coprecipitation or impregnation. Examples of suitable salts are nickel nitrate, nickel acetate, nickel formate, and nickel acetonyl acetate as well as corresponding cobalt salts. Nickel chloride and/or cobalt chloride may be used, but these salts are not decomposed by heating in air. Instead they can be transferred into metal by heating in hydrogen gas. Another method of deposing metals on the support is using nickel or cobalt carbonyl gas and decomposing it on the surface of the support to extremely finely divided metal. In accordance with the invention nickel and cobalt may be used alone, in admixture with each other, or one of them may be put on top of the other one. Which metal and which application method that will give the best result in each single amination process cannot be predicted but must be determined experimentally. As long as recognized principles of hydrogenation catalyst manufacture are used, the particular method of impregnating or coating the nickel or cobalt metal onto the support material has not been found to have any significant effect on the activity or selectivity of the final catalyst.

The amount of nickel and/or cobalt to be used depends on the composition and physical characteristics such as surface area and pore distribution of the catalyst support. In most cases the most active catalysts have been found to be those in which the contents of nickel and/or cobalt are between 5 and 20 percent of total catalyst weight and of ruthenium between 0.2 and 3 percent of total catalyst weight on a support having 50–150 square meters inner area per gram. The amount of the nickel and/or cobalt metal on the support has mainly an effect on the activity of the catalyst and less on the selectivity.

After the support material being impregnated with the desired amount of nickel and/or cobalt salt, it is dried and then calcinated to decompose the salts into metal oxides. This can be accomplished by heating the catalyst first gently and, if desired, under reduced pressure to evaporate the impregnating solvent, then in a stream of air raising the temperature to 300°–600° C. depending on the decomposition temperature of the salt used and keeping that temperature until the salt is completely transferred into oxides. It is essential for the result that minor amounts of salts used, especially of nitrates, do not remain undecomposed after the calcination. It is also possible to transfer the oxides formed into metals prior to ruthenium treatment by reacting the catalyst intermediate with hydrogen gas at elevated temperature.

The ruthenium treatment of the nickel oxide and/or cobalt oxide catalyst or nickel and/or cobalt catalyst is performed by impregnating it with a solution in water or in an organic solvent of the chosen ruthenium halide and drying the catalyst at 50°–100° C. in a stream of inert gas, air or hydrogen. The impregnation may be performed by spraying the solution evenly onto the catalyst, or adsorbing the ruthenium compound from a dilute solution to the surface of the coated support, or wetting the catalyst with ruthenium solution and evaporating the solvent. To prevent hydrolysis of ruthenium salt the impregnating solution may contain minor amounts of hydrochloric acid or other hydrogen halide.

The ruthenium halide is then reduced to ruthenium metal by heating the catalyst at about 150 to 200° C. for 0.5–3 hours in a stream of hydrogen gas. Then, in order to reduce nickel and/or cobalt oxides into finely divided metal, the temperature is raised, preferably to 300 to 600° C., still in the stream of hydrogen, and the temperature is kept at that level until desired degree of reduction is reached. Usually a high degree of reduction is preferred, but because of sintering of the support material and nickel and cobalt powder at prolonged heating, resulting in decreased surface area, a lower degree of reduction is sometimes tolerated. In case cobalt and/or nickel is present in metallic form at the impregnation with ruthenium halide, only reduction of ruthenium is necessary.

The activated catalyst is best handled in the absence of air in order to prevent the reoxidation of nickel or cobalt. The catalyst may also be stabilized by gentle oxidation, carbon dioxide treatment, or other conventional techniques for stabilizing pyrophoric catalysts, and may then be handled in air prior to its utilization.

Various ruthenium halides can be used in the ruthenium treatment step according to this invention. Examples of suitable salts are soluble forms of ruthenium trichloride, ruthenium ammonium chloride, ruthenium potassium chloride, ruthenium nitrosyl chloride, ruthenium potassium nitrosyl chloride, chlororuthenous acid, ruthenium red (hydroxochlorotetrammine ruthenium chloride), and corresponding bromides and iodides. The preferred ruthenium compound, considering availability, price, and performance, is ruthenium trichloride hydrate. Non-halides, such as ruthenium dioxide, ruthenium sulphate, ruthenium nitrate, ruthenium nitrosyl nitrate, ruthenium ammonium nitrate, ruthenium acetyl acetonate, and potassium perruthenate, although promoting the activity of a nickel or cobalt catalyst, will not give a noticeable improvement of the selectivity in organic hydrogenations, compared with corresponding catalysts without ruthenium promotion, and are consequently not included in present invention.

The ruthenium promoted nickel/cobalt catalysts of the present invention may be further improved by incorporating additional components. Examples of such components are metals and metal oxides from antimony, bismuth, cerium, chromium, copper, iron, manganese, molybdenum, rhenium, thorium, titanium, tungsten, uranium, vanadium, zirconium, and noble metals others than ruthenium. Other examples are compounds of phosphorus and boron.

As mentioned, the catalyst in accordance with the invention is especially suitable to be used in amination reactions. In an amination process alkylene oxide, hydroxyl containing compounds, such as alcohols, phenols, and alkanolamines, as well as aldehydes and ketones can be transferred into corresponding amines by reacting said compound with ammonia, primary and secondary amines in a continuous or batchwise process.

All hydrogen atoms on an amine nitrogen are potentially replaceable by the alkyl radical of the reacting alkylene oxide, hydroxyl or carbonyl compound, so the reaction product will be a mixture of primary, secondary, and tertiary amines. When aminating ethylene compounds such as ethylene glycols and ethanolamines, cyclisation occurs giving not only straight chain and branched di- and polyamines but also six membered heterocyclic amines, such as piperazine, morpholine, and their derivatives.

the most desirable products in the manufacture of ethylene amines are such containing mainly primary amino groups. By-products containing tertiary amino groups and heterocyclic rings are of less commercial value. The present catalyst has a surprisingly high selectivity for formation of primary and non-cyclic compounds at high reaction rate.

The amination of ethylene glycol with ammonia may be illustrated by following chemical formulas describing a few of all possible reactions:

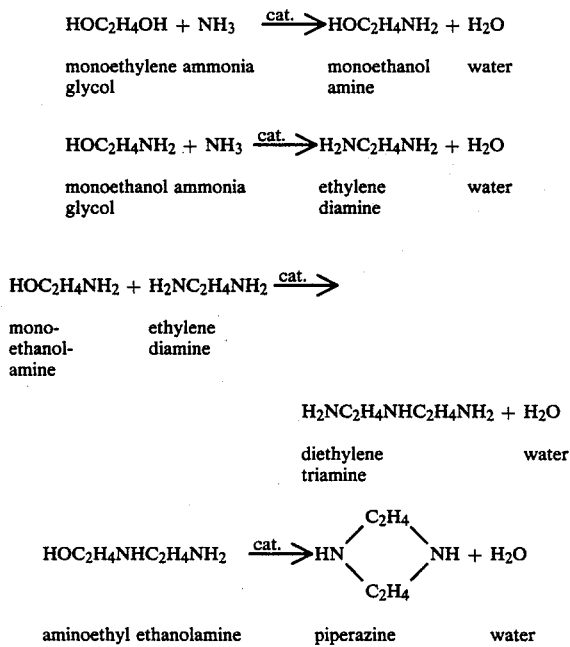

Each of the reactions above consists of three consecutive steps:

(a) Dehydrogenating the hydroxyl containing compound to corresponding aldehyde or ketone (b) Adding an aminating agent to that reaction product to form an imine (c) Hydrogenating the imine to the corresponding amine.

Consequently, the catalytic reaction of this invention s also useful for amination of aldehydes and ketones and for hydrogenation of imines to the corresponding amines.

Alkylene oxides suitable for amination are those having 2–22 carbon atoms in the alkylene group. Specific examples are ethylene oxide, 1,2-propylene oxide, 1,2-butylene oxide and 2,3-butylene oxide. Aliphatic alcohols which can be aminated in the process of the present invention include saturated aliphatic monohydric and polyhydric alcohols having from one to thirty carbon atoms, including, for example, saturated monohydric alcohols, such as methanol, ethanol, propanol, isopropanol, n-butanol, sec-butanol, tert-butanol, isobutanol, n-pentanol, isopentanol, neopentanol, n-hexanol, isohexanol, 2-ethyl hexanol, cyclohexanol, n-heptanol, n-octanol, 2-octanol, isooctanol, and tert-octanol, and various isomers of nonanol, decanol, hendecanol, dodecanol, tridecenol, tetradecanol, hexadecanol, and octadecanol, arachidyl alcohol, aliphatic dihydric alcohols having from two to about thirty carbon atoms, such as ethylene glycol, diethylene glycol, triethylene glycol, tetraethylene glycol, and higher polyethylene glycols, 1,2- and 1,3-propylene glycol, dipropylene glycol, tripropylene glycol and higher polypropylene glycols, 1,2-butylene glycol, 1,3-butylene glycol, 1,4-butylene glycol, 2,3-butylene glycol, dibutylene glycol, tributylene glycol or higher polybutylene glycols, isomers of pentanediol, hexanediol, octanediol, nonanediol, decanediol, undecanediol, dodecanediol, tridecanediol, tetradecanediol, pentadecanediol, hexadecanediol, octadecanediol, eicosanediol, and trihydric and higher polyols having from three to about thirty carbon atoms, such as glycerol, erythritol, pentaerythritol, sorbitol, mannitol, trimethylol ethane, trimethylol propane, heptanetriol, and decanetriol.

Further, it is possible to use aldehydes and ketones derives from the above mentioned alcohols e.g. by dehydrogenation. Suitable aldehydes are formaldehyde, acetaldehyde, propionaldehyde, butyraldehydes, cyclohexanal benzaldehyde, and aldehydes prepared by the dehydrogenation of dihydric and trihydric alcohols, monoalkylene glycol ethers, polyalkylene glycol ethers, and alkanolamines. Suitable ketones are acetone, methyl-ethyl-ketone, various isomers of pentanone and hexanone, 1-phenyl-2-propanone, acetophenone, n-butyrophenone, and benzophenone as well as ketones prepared by dehydrogenation of dihydric and trihydric alcohols, mono- and polyalkylene glycol ethers and alkanolamines.

Among phenols suitable for amination may be mentioned phenol, o-cresol, m-cresol, p-cresol, pyrocatechin, resorcinol, hydroquinone and isomers of xylenol, and among aliphatic aminoalcohols those having from two to thirty carbon atoms, such as monoethanolamine, diethanolamine, aminoethyl ethanolamine, propanolamines, butanolamines, pentanolamines, hexanolamines, heptanolamines, octanolamines, decanolamines, dodecanolamines, tetradecanolamines, hexadecanolamines, octadecanolamines, and eicosanolamines. In addition, mixtures of the above alcohols can be employed, for example, mixtures of ethylene glycol and monoethanolamine, or mixtures of alkanolamines which are obtained by reacting alkylene oxides with ammonia.

The aminating agents are ammonia or primary amines or secondary amines. The amines generally have alkyl groups of 1–20 carbon atoms, cycloalkyl groups of 5–8 carbon atoms and aryl- or arylalkyl groups of 6–40 carbon atoms. Examples of suitable amines are methylamine, ethylamine, n-butylamine, isobutylamine, ethylenediamine, benzylamine, dimethylamine and diethylamine. The aminating agents, as well as the alkylene oxides and hydroxyl containing compounds, aldehydes and ketones can be used alone or in combination with one another.

The reaction between the aminating agent and the compound to be aminated is carried out in the presence of hydrogen gas, in order to ensure a good yield of the desired aliphatic amine products. Generally, the quantity of hydrogen gas required is relatively small, and corresponds to a proportion of from about 0.1 to about 2 moles per mole hydroxyl. Higher proportions of hydrogen can be employed, but generally, however, without any noticeable benefit. The aminating agent such as ammonia should be present in excess in the mixture, for example, within the range from about 2 to about 30 moles aminating agent per mole of the compound to be aminated, and preferably within the range from about 5 to about 15 moles per mole. The amount of the catalyst is not critical, but normally it will be 0.1–25 %, preferably 1–15 %, by weight of the total amount of starting reactants in a batchwise process.

In carrying out the amination process, an elevated temperature should be employed. Temperatures within the range from about 120 to 300° C. are suitable. Particularly good yield and good selectivities are obtained employing temperatures within the range from about 175° to about 225° C.

The amination process is carried out at a relatively high pressure. The pressure employed is dependent upon the molar ratio of the reactants, the reaction temperature, the amount of hydrogen, and the kind of operation. Generally, the pressure should be high enough to keep most of the reactants in the liquid phase. The pressure is normally within the range from about 8 to about 40 MPa and preferably from 15 to about 30 MPa.

The equipment used in carrying out the amination process of this invention can be any conventional high temperature and pressure equipment adapted for batch or continuous operation. For example, in a batch process a pressure reactor vessel can be used, such as an autoclave equipped with an agitator and heating means. The process can be carried out as a continuous process, wherein the reactants in gas and liquid phase are passed under pressure over a solid catalyst bed maintained at the desired reaction temperature. The catalyst can also be in a fluidized bed, or passed countercurrently to the reaction mixture. The reaction mixture is worked up by first separating ammonia and hydrogen and then separating the various products by fractional distillation.

The invention is further illustrated by the following examples.

EXAMPLES 1

A concentrated aqueous metal nitrate solution containing the amount of metals given in TABLE I was added to 90 grams of activated alumina catalyst support in form of tablets with length and diameter of about 3 mm and a surface area of about 100 square meters per gram support. Excess of the liquid was evaporated in vacuum at about 75° C., the tablets were dried, and the nitrates were decomposed to the corresponding oxides by heating to 500° C. in a stream of dry air. After cooling the tablets were impregnated with a two percent aqueous solution of the ruthenium compound, the compound and amount of ruthenium is stated in TABLE I, and dried at 100° C. in air.

The tablets were then heated in a stream of hydrogen gas, first for one hour at about 150°–200° C. to convert the ruthenium compound to ruthenium metal, then for four hours at 400° C. to reduce the metal oxides to metals in a finely dispersed form.

TABLE I

| CATALYST No. | METAL NITRATE | | RUTHENIUM COMPOUND | |
|---|---|---|---|---|
| | Metal | Metal amount grams | Compound | Ruthenium amount grams |
| A1 | nickel | 10 | ruthenium chloride hydrate | 0.5 |
| B1 | nickel | 10 | — | — |
| A2 | nickel | 7.5 | ruthenium chloride hydrate | 0.5 |
| | copper | 2.2 | | |
| | chromium | 0.3 | | |
| B2 | nickel | 7.5 | | |
| | copper | 2.2 | | |
| | chromium | 0.3 | — | — |
| A3 | cobalt | 10 | ruthenium chloride hydrate | 0.5 |
| B3 | cobalt | 10 | — | — |
| A4 | nickel | 4 | ruthenium chloride hydrate | 0.25 |
| | cobalt | 4 | | |
| | iron | 4 | | |
| A5 | nickel | 4 | ruthenium chloride hydrate | 0.5 |
| | cobalt | 4 | | |
| | iron | 4 | | |
| A6 | nickel | 4 | ruthenium chloride hydrate | 1.0 |
| | cobalt | 4 | | |
| | iron | 4 | | |
| B4 | nickel | 4 | | |
| | cobalt | 4 | | |
| | iron | 4 | — | — |
| B5 | nickel | 4 | ruthenium nitrate | 0.5 |

TABLE I-continued

| CATALYST No. | METAL NITRATE | | RUTHENIUM COMPOUND | |
|---|---|---|---|---|
| | Metal | Metal amount grams | Compound | Ruthenium amount grams |
| | cobalt | 4 | | |
| | iron | 4 | | |
| B6 | nickel | 4 | ruthenium nitrate | 1.0 |
| | cobalt | 4 | | |
| | iron | 4 | | |
| A7 | nickel | 10 | ruthenium bromide | 0.5 |
| B7 | nickel | 10 | — | |
| A8 | nickel | 10 | ruthenium potassium chloride | 0.5 |
| A9 | nickel | 10 | ruthenium nitrosyl chloride | 0.5 |
| A10 | nickel | 10 | ruthenium potassium nitrosyl chloride | 0.5 |
| A11 | nickel | 10 | ruthenium ammonium chloride | 0.5 |
| B11 | nickel | 10 | ruthenium ammonium nitrate | 0.5 |

EXAMPLE 2

A 300 ml autoclave, equipped with a stirrer and temperature control, was flushed with nitrogen gas. Eight grams of one of the catalyst manufactured in Example 1, 25 grams of monoethanol amine, 3.5 grams of water, and 65 grams of liquid ammonia were charged into the autoclave. The autoclave was closed, and hydrogen gas was introduced to a pressure of 5.5 MPa. The contents of the autoclave was heated to 200° C. and kept at this temperature with continuous stirring until the completion of the test.

Samples were withdrawn from the autoclave during the reaction and analysed using gas-liquid chromatography. The conversion of the aminable compound charged was calculated as well as the amounts of products formed in the reaction. The results obtained are evident from TABLE II.

The conversion was defined as the ratio between the amount of the aminable starting compound consumed in the reaction and the amount originally charged.

EXAMPLE 3

A mixture of 6.25 grams of diethanolamine and 18.75 grams of monoethanolamine was reacted with ammonia as described in Example 2. The catalyst used was catalyst A1 described in Example 1, and as comparison catalyst B1 was used. The results obtained are evident from TABLE III.

EXAMPLE 4

A mixture of 6.25 grams of aminoethyl ethanolamine and 18.75 grams of monoethanolamine was reacted with ammonia in the same manner as in Example 3. The results obtained are evident from TABLE III.

EXAMPLE 5

A mixture of 12.5 grams of monoethylene glycol and 12.5 grams of monoethanolamine was reacted with ammonia in the same manner as in Example 3. The results obtained are evident from TABLE III.

From the results shown in TABLE II and III it is evident that the catalysts in accordance with the invention favor the formation of primary amino groups.

Abbreviations:
EDA = Ethylenediamine

MEA = Monoethanolamine
PIP = Piperazine
DETA = Diethylenetriamine
AEP = Aminoethyl piperazine
AEEA = Aminoethyl ethanolamine
HEP = Hydroxyethyl piperazine
DEA = Diethanolamine

TABLE II

| Catalyst | Conversion % | Products formed, weight % | | | | | | Amino groups, mole % | | |
|---|---|---|---|---|---|---|---|---|---|---|
| | | EDA | DETA | AEEA | PIP | AEP | HEP | Primary | Secondary | Tertiary |
| A1 | 76 | 60.0 | 20.3 | 6.1 | 9.9 | 2.3 | 1.4 | 82 | 17 | 0.9 |
| B1 | 76 | 54.4 | 14.2 | 4.4 | 20.8 | 4.4 | 1.5 | 74 | 24 | 1.5 |
| A2 | 40 | 81 | 7.7 | 4.1 | 6.7 | 0.2 | 0.3 | 82 | 17 | 0.9 |
| B2 | 40 | 75 | 4.5 | 2.8 | 15.5 | 1.5 | 0.7 | 85 | 15 | 0.6 |
| A3 | 88 | 56 | 7.9 | 5.3 | 25.5 | 3.1 | 1.3 | 73 | 26 | 1 |
| B3 | 88 | 43 | 7.7 | 6.5 | 33.8 | 5.5 | 2.4 | 62 | 36 | 2 |
| A4 | 60 | 67 | 7.7 | 8.5 | 12.8 | 2.0 | 2.0 | 83 | 16 | 1 |
| A5 | 60 | 72 | 7.9 | 8.0 | 7.7 | 1.0 | 1.4 | 88 | 12 | 1 |
| A6 | 60 | 71 | 10.2 | 6.9 | 9.2 | 1.4 | 1.3 | 86 | 13 | 1 |
| B4 | 60 | 58 | 9.9 | 19.9 | 14.1 | 2.5 | 3.3 | 77 | 22 | 2 |
| B5 | 60 | 61 | 9.2 | 10.1 | 13.9 | 2.6 | 3.2 | 80 | 19 | 1 |
| B6 | 60 | 62 | 10.0 | 7.1 | 16.0 | 2.4 | 2.5 | 79 | 19 | 1 |
| A7 | 60 | 60 | 14.5 | 5.5 | 8.1 | 1.7 | 1.2 | 86 | 13 | 1 |
| B7 | 60 | 63 | 11.2 | 7.3 | 13.8 | 2.5 | 2.2 | 81 | 18 | 1 |
| A8 | 60 | 69 | 14.7 | 5.4 | 8.1 | 1.7 | 1.2 | 86 | 13 | 1 |
| A9 | 60 | 69 | 13.9 | 5.5 | 9.0 | 1.6 | 1.0 | 86 | 13 | 1 |
| A10 | 60 | 70 | 12.3 | 5.3 | 9.3 | 2.0 | 1.1 | 86 | 13 | 1 |
| A11 | 60 | 69 | 13.2 | 5.8 | 8.4 | 2.3 | 1.3 | 86 | 13 | 1 |
| B11 | 60 | 63 | 10.5 | 6.1 | 14.0 | 3.6 | 2.8 | 80 | 18 | 2 |

TABLE III

| Ex. | Catalyst | Conversion, % | Composition of reaction mixture after completion of the reaction, weight % | | | | | | | | Amino groups, mole % | | |
|---|---|---|---|---|---|---|---|---|---|---|---|---|---|
| | | | EDA | MEA | PIP | DETA | AEP | AEEA | HEP | DEA | Primary | Secondary | Tertiary |
| 3 | A1 | 70 | 55 | 24 | 7.6 | 4.9 | 0.8 | 2.9 | 0.7 | 4.3 | 88 | 12 | 1 |
|   | B1 | 70 | 33 | 23 | 14.7 | 7.2 | 3.2 | 13.2 | 2.5 | 4.3 | 68 | 29 | 2 |
| 4 | A1 | 60 | 30 | 30 | 7.4 | 7.3 | 0.9 | 23.0 | 1.7 | 0.0 | 80 | 18 | 1 |
|   | B1 | 60 | 27 | 30 | 14.9 | 6.6 | 3.2 | 16.0 | 2.8 | 0.0 | 68 | 29 | 3 |
| 5 | A1 | 50 | 26 | 25 | 2.6 | * | 2.8 | * | 0.6 | 0.1 | 89 | 9 | 3 |
|   | B1 | 50 | 30 | 27 | 8.8 | * | 2.1 | * | 1.8 | 0.6 | 79 | 19 | 2 |

*Due to difficulties in analyzing, this component was not determined.

I claim:

1. A process of catalyzing an amination reaction in which one of an alkylene oxide, a hydroxyl-containing compound, an aldehyde, and a ketone is reacted with one of ammonia, a primary amine, and a secondary amine, and which favors the formation of primary or noncyclic amines, comprising conducting the reaction in the presence of a halogen-containing, ruthenium-promoted, nickel and/or cobalt catalyst containing:
   from 4 to 40 % by weight, based on the total weight of said catalyst, of at least one metal selected from nickel and cobalt;
   from 0.1 to 5 % by weight, based on the total weight of said catalyst, of ruthenium which ruthenium was introduced as a solution of ruthenium halide; and
   a porous metal oxide support comprised of at least 50 % by weight of activated alumina,
   wherein said at least one metal selected from nickel and cobalt and said ruthenium are in the metallic state.

2. The process according to claim 1, wherein one of ethylene oxide, ethylene glycol, and ethanolamine is aminated with ammonia.

3. The process according to claim 1, wherein the catalyst contains from 5 to 20 % by weight of the at least one metal selected from nickel and cobalt, from 0.2 to 3 % by weight of the ruthenium, and the porous metal oxide support is comprised of at least 98 % by weight of activated alumina.

4. The process according to claim 1, wherein the porous metal oxide support has an inner surface area ranging from 10 to 1,000 square meters per gram.

5. The process according to claim 1, wherein the ruthenium halide compound is ruthenium trichloride hydrate.

6. The process according to claim 1, wherein the catalyst is prepared by a process comprising:
   coating said porous metal oxide support with at least one metal selected from nickel and cobalt in the form of metals or oxides;
   impregnating said coated support with a solution of a ruthenium halide compound to form a catalyst intermediate;
   reducing said ruthenium halide compound to ruthenium metal by causing said catalyst intermediate to react with hydrogen gas at an elevated temperature sufficient to reduce said ruthenium halide compound to ruthenium metal; and
   reducing said oxide of said at least one metal selected from nickel and cobalt to metal by causing said oxide to react with hydrogen gas at an elevated temperature sufficient to reduce said oxide to metal.

7. The process according to claim 6, wherein the reduction of said ruthenium halide compound takes place at a temperature of at least 150 ° C., and wherein reduction of said oxide of said at least one metal selected from nickel and cobalt takes place at a temperature above 200 ° C.

8. The process according to claim 7, wherein the catalyst contains from 5 to 20 % by weight of the at least one metal selected from nickel and cobalt, from 0.2 to 3 % by weight of the ruthenium, and the porous metal oxide support is comprised of at least 98 % by weight of activated alumina.

9. The process according to claim 8, wherein the porous metal oxide support has an inner surface area ranging from 10 to 1,000 square meters per gram.

10. The process according to claim 9, wherein the ruthenium halide compound is ruthenium trichloride hydrate.

11. The process according to claim 7 wherein one of ethylene oxide, ethylene glycol, and ethanolamine is reacted with ammonia.

12. A process for the manufacture of amination products which favors the formation of primary or noncyclic amines by reacting one of an alkylene oxide, a hydroxyl-containing compound, an aldehyde, and a ketone with one of ammonia, a primary amine, and a secondary amine at a temperature ranging from 120° to 300° C. in the presence of hydrogen gas and a halogen-containing, ruthenium-promoted, nickel and/or cobalt catalyst containing:

from 4 to 40% by weight, based on the total weight of said catalyst, of at least one metal selected from nickel and cobalt;

from 0.1 to 5% by weight, based on the total weight of said catalyst, of ruthenium, which ruthenium was introduced as a solution of ruthenium halide; and a porous metal oxide support comprised of at least 50% by weight of activated alumina, wherein said at least one metal selected from nickel and cobalt and said ruthenium are in the metallic state.

13. The process according to claim 12, wherein one of ethylene oxide, ethylene glycol, and ethanolamine is reacted with ammonia.

14. The process according to claim 12, wherein the catalyst contains from 5 to 20% by weight of the at least one metal selected from nickel and cobalt, from 0.2 to 3% by weight of the ruthenium, and the porous metal oxide support is comprised of at least 98% by weight of activated alumina.

15. The process according to claim 12, wherein the porous metal oxide support has an inner surface area ranging from 10 to 1,000 square meters per gram.

16. The process according to claim 12, wherein the ruthenium compound is ruthenium trichloride hydrate.

17. The process according to claim 12, wherein the catalyst is prepared by a process comprising:

coating said porous metal oxide support with at least one metal selected from nickel and cobalt in the form of metals or oxides;

impregnating said coated support with a solution of a ruthenium halide compound to form a catalyst intermediate;

reducing said ruthenium halide compound to ruthenium metal by causing said catalyst intermediate to react with hydrogen gas at an elevated temperature sufficient to reduce said ruthenium halide compound to ruthenium metal; and reducing said oxide of said at least one metal selected from nickel and cobalt to metal by causing said oxide to react with hydrogen gas at an elevated temperature sufficient to reduce said oxide to metal.

18. The process according to claim 17, wherein the reduction of said ruthenium halide compound takes place at a temperature of at least 150° C., and wherein reduction of said oxide of said at least one metal selected from nickel and cobalt takes place at a temperature above 200° C.

19. The process according to claim 18, wherein the catalyst contains from 5 to 20% by weight of the at least one metal selected from nickel and cobalt, from 0.2 to 3% by weight of the ruthenium, and the porous metal oxide support is comprised of at least 98% by weight of activated alumina.

20. The process according to claim 19, wherein the porous metal oxide support has an inner surface area ranging from 10 to 1,000 square meters per gram.

21. The process according to claim 20, wherein the ruthenium halide compound is ruthenium trichloride hydrate.

22. The process according to claim 17, wherein one of ethylene oxide, ethylene glycol, and ethanolamine is reacted with ammonia.

* * * * *